(12) United States Patent
Rubin

(10) Patent No.: US 6,789,838 B1
(45) Date of Patent: Sep. 14, 2004

(54) VEHICLE SHADE ASSEMBLY

(76) Inventor: Thomas P. Rubin, 25 Spring St., Mount Kisco, NY (US) 10549

( * ) Notice: Subject to any disclaimer, the term of this patent is extended or adjusted under 35 U.S.C. 154(b) by 17 days.

(21) Appl. No.: 10/455,075

(22) Filed: Jun. 6, 2003

(51) Int. Cl.$^7$ .................................................. B60J 1/20
(52) U.S. Cl. ..................... 296/152; 296/97.8; 296/97.9; 296/136.12; 296/136.13; 160/370.21
(58) Field of Search ............................. 296/146.1, 152, 296/97.1, 97.4, 97.5, 97.8, 97.9, 136.01, 136.11, 136.12, 136.13; 160/161, 159, 136, 377, 370.21, 342, 107, 90

(56) References Cited

U.S. PATENT DOCUMENTS

| | | | |
|---|---|---|---|
| 2,821,248 A | | 1/1958 | Irvine |
| 2,840,162 A | * | 6/1958 | Moerdyk .................... 160/377 |
| 3,045,747 A | * | 7/1962 | Hill ............................. 160/331 |
| 4,557,082 A | * | 12/1985 | Dunsworth ................. 52/109 |
| 4,805,654 A | | 2/1989 | Wang |
| 4,842,324 A | | 6/1989 | Carden |
| 4,952,007 A | | 8/1990 | Shahrokh |
| D323,481 S | * | 1/1992 | Freeman ..................... D12/183 |
| 5,085,473 A | * | 2/1992 | Yang ........................... 296/141 |
| 5,344,206 A | * | 9/1994 | Middleton ................. 296/97.8 |
| 5,388,883 A | | 2/1995 | Yang |
| 5,694,998 A | * | 12/1997 | Chen ..................... 160/370.21 |
| D393,828 S | | 4/1998 | Threats, Sr. |
| 5,762,393 A | | 6/1998 | Darmas, Sr. |

FOREIGN PATENT DOCUMENTS

DE        DT 2158486       * 11/1971

* cited by examiner

Primary Examiner—D. Glenn Dayoan
Assistant Examiner—Patricia L. Engle

(57) ABSTRACT

A vehicle shade assembly includes a pair of frames each having a selectively expandable width. A plurality of mountings is attached to each of the frames. Each of the mountings is adapted for removably coupling the frames to upper edges of vehicle windows. Each of a pair of flexible panels has a first side and a second side. The first sides of the pair of flexible panels are each attached to one of the frames such that the frames are positioned between the mountings and the flexible panels. The flexible panels are mounted on windows of opposite sides of the vehicle such that the flexible panels cover the windows.

9 Claims, 5 Drawing Sheets

VEHICLE SHADE ASSEMBLY

BACKGROUND OF THE INVENTION

1. Field of the Invention

The present invention relates to vehicle shading devices and more particularly pertains to a new vehicle shading device for preventing sunlight from entering a vehicle.

2. Description of the Prior Art

The use of vehicle shading devices is known in the prior art. U.S. Pat. No. 5,388,883 describes a device for forming a canopy over a vehicle. Another type of vehicle shading device is U.S. Pat. No. 4,805,654 that includes an umbrella type device for positioning on a vehicle. U.S. Pat. No. 5,762,393 includes a housing mountable on a vehicle. A shading panel is removable from the housing. U.S. Pat. No. 4,952,007 includes a vehicle cover and connecting system for protecting the top of a vehicle. U.S. Pat. No. 4,842,324 includes a panel, having specific measurements and cuts, which is draped over the top of a vehicle to prevent light from entering therein.

While these devices fulfill their respective, particular objectives and requirements, the need remains for a device that is retrofittable to any vehicle for preventing sunlight from entering the vehicle from the side windows while ensuring that the finish of the vehicle is not damaged by the device.

SUMMARY OF THE INVENTION

The present invention meets the needs presented above by including a frame mountable to any vehicle side window.

Another object of the present invention is to provide a new vehicle shading device that holds a flexible panel in spaced relationship with respect to the vehicle to ensure the that the finish of the vehicle is not damaged by debris such as dust which would otherwise be rubbed into the finish if the panel is positioned directly on the vehicle.

To this end, the present invention generally comprises a pair of frames each having a selectively expandable width. A plurality of mountings is attached to each of the frames. Each of the mountings is adapted for removably coupling the frames to upper edges of vehicle windows. Each of a pair of flexible panels has a first side and a second side. The first sides of the pair of flexible panels are each attached to one of the frames such that the frames are positioned between the mountings and the flexible panels. The frames are mounted on windows of opposite sides of the vehicle such that the flexible panels cover the windows.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
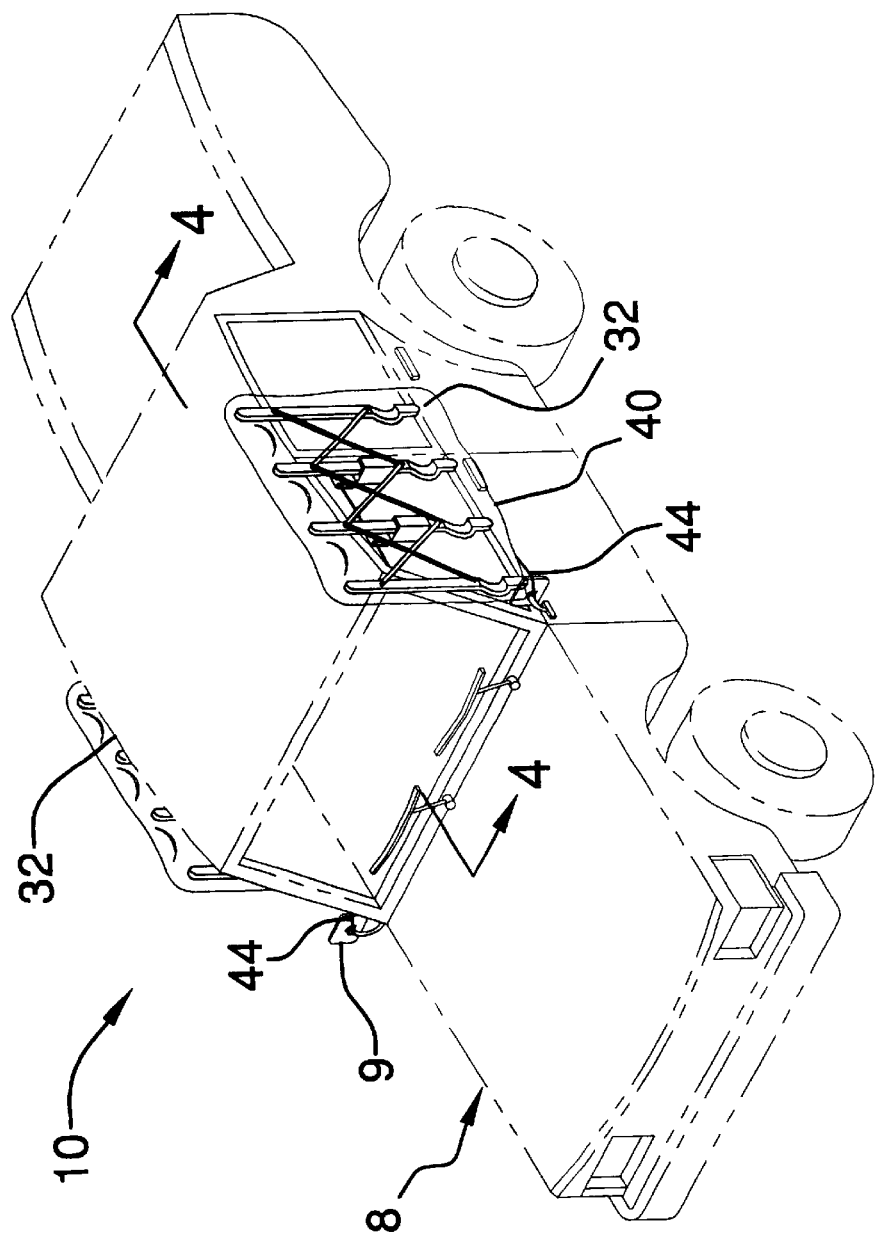
FIG. 1 is a schematic perspective in-use view of a vehicle shade assembly according to the present invention.
Figure 2:
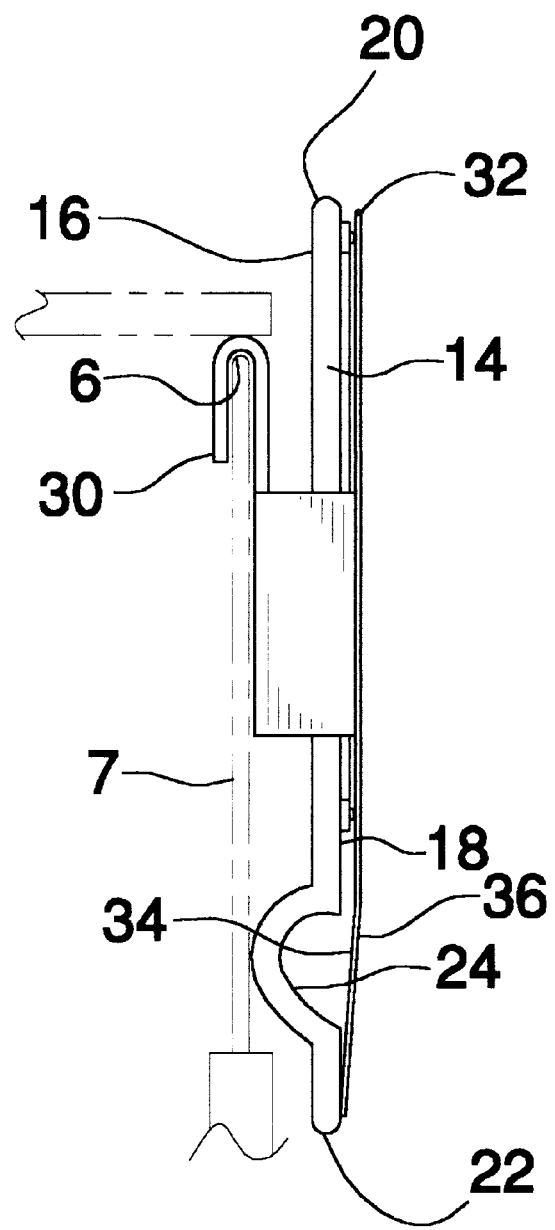
FIG. 2 is a schematic side view of the frame the present invention.
Figure 3:
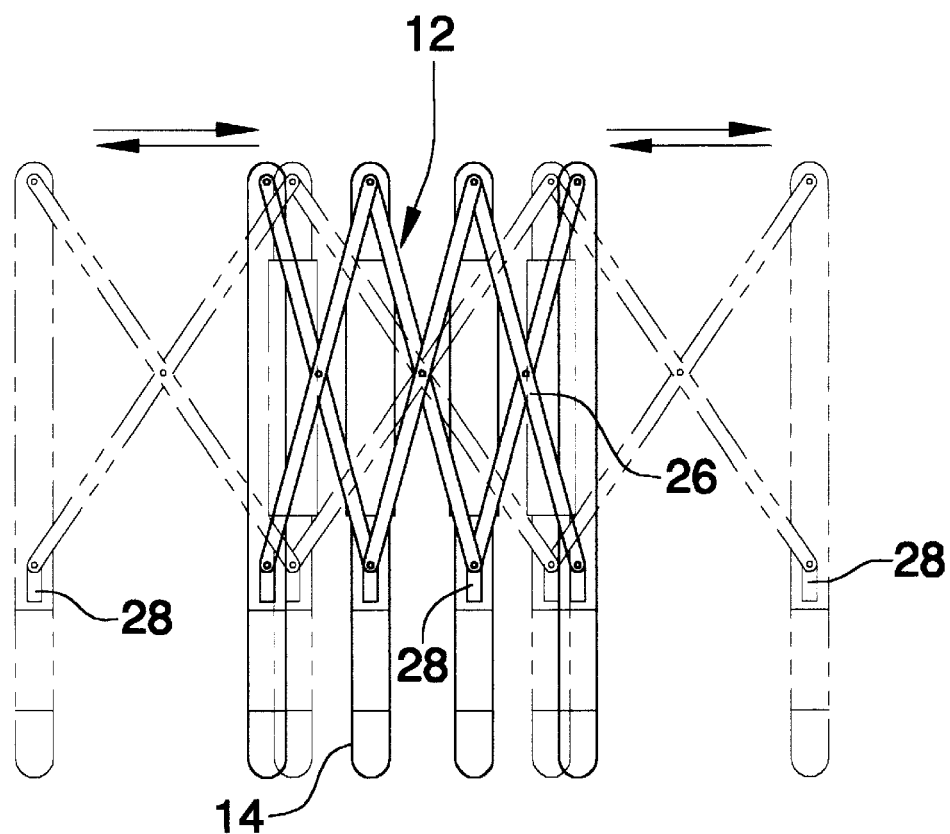
FIG. 3 is a schematic front view of the frame of the present invention.
Figure 4:
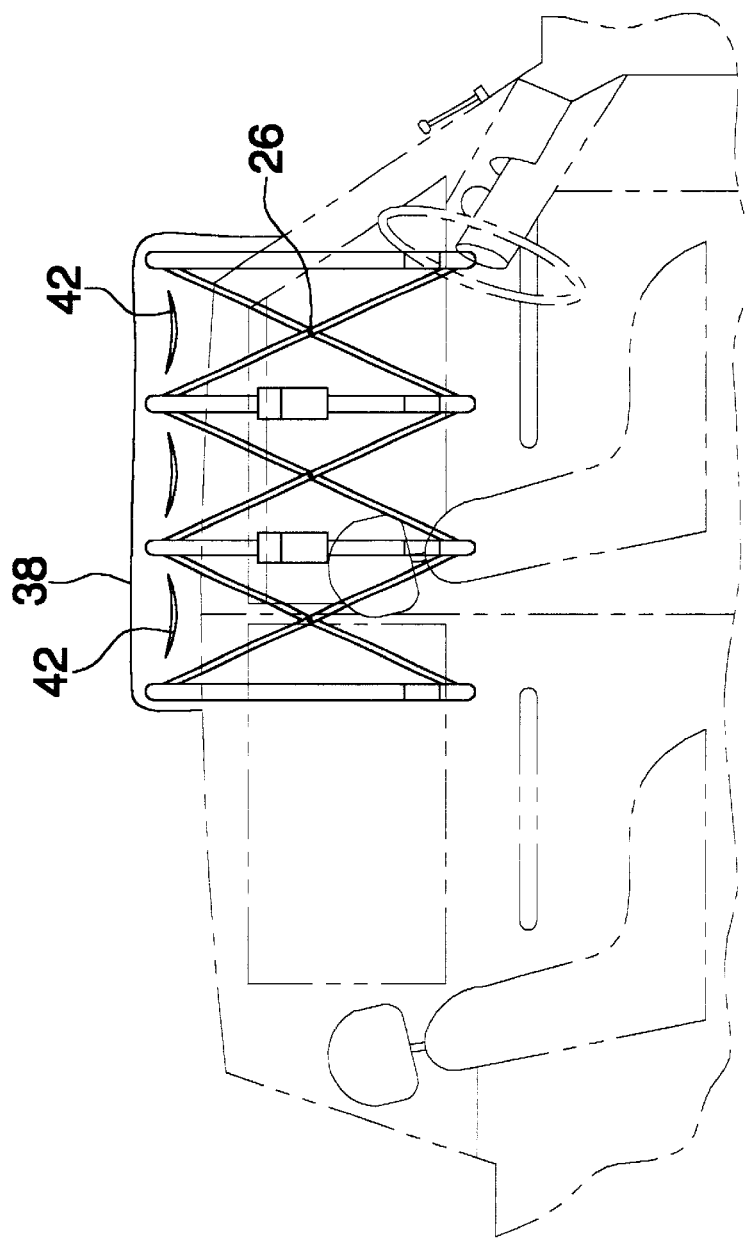
FIG. 4 is a schematic side-view taken along line 4—4 of the present invention.

With reference now to the drawings, and in particular to FIGS. 1 through 4 thereof, a new vehicle shading device embodying the principles and concepts of the present invention and generally designated by the reference numeral 10 will be described.

As best illustrated in FIGS. 1 through 4, the vehicle shade assembly 10 generally comprises a pair of frames 12. Only one of the frames 12 is visible, though FIG. 1 is a mirror image of an opposite side of the assembly 10. Each of the frames 12 has a selectively expandable width. Each of the frames 12 includes a plurality of elongated members 14 secured together such that the elongated members 14 are each positioned in a plane and(a inner side 16 and an outer side 18 for each elongated members 14 is defined. The elongate members 14 each have a longitudinal axis. The longitudinal axes are orientated substantially parallel to each other. Each of the elongated members 14 has an upper end 20 and a lower end 22. Each of the elongated members 14 has an arcuate portion 24 therein such that the inner sides 16 have a convexly curved area. The arcuate portions 24 are positioned nearer the lower end 22 than the upper end 20. A plurality of couplers 26 couple each of the elongated members 14 to an adjacent one of the elongated members 14 such that adjacently positioned pairs of the elongate members 14 may be selectively positioned narrowly spaced from each other or widely spaced from each other. The couplers 26 depicted include accordion-type couplers of rods pivotally coupled together in an X-shaped configuration and pivotally coupled to the elongated members and positioned in slots 28 within the elongated members 14 so their ends may move within the slots 28. This allows the elongated members 14 to be moved toward each other or away from each other while keeping their longitudinal axes substantially parallel to each other. However, other mechanical couplers may also be used to establish the same movement of the elongated members.

A plurality of mountings 30 is attached to each of the frames 12. Each of the mountings 12 is adapted for removably coupling the frames 12 to an upper edge 6 of windows 7 of a vehicle 8. The mountings 30 are attached to the frames 12 such that the upper ends 20 of the elongate members 14 extend vertically above the mountings 30. Each of the mountings 30 comprises a hook that is attached to one of the inner sides 16 of the elongated members 14 such that each of the elongated members 14 has one hook attached thereon. Each of the hooks, or mountings 30, is positioned nearer a respective one of the upper ends 20 than the lower ends 22.

Each of a pair of flexible panels 32 each has a first side 34 and a second side 36. Each of the first sides 34 of the pair of flexible panels is attached to one of the frames 12 such that the frames 12 are positioned between the mountings 30 and the flexible panels 32. The flexible panels 32 may comprise a cloth material or a plastic material. In the case of a plastic material, the panels 32 may be either opaque, a translucent material or a shaded transparent material. Alternatively, the panels 32 may comprise a reflective material for reflecting sunlight that strikes the panels 32. The flexible panels each have an upper edge 38 and a lower edge 40. Each of the panels 32 has a row of slots 42 extending therethrough that are orientated generally parallel to and spaced from one of the upper edges 38.

Each of a pair of securing members 44 is attached to one of the flexible panels 32. The securing members 44 are positioned for removably attaching the panels 32 to side mirrors 9 mounted on the vehicle 8. Each of securing members 44 includes a loop comprising an elastic material. The panel 32 is preferably comprised of a reflective material for reflecting sunlight that strikes the top surface 34 of the panel.

Figure 5:
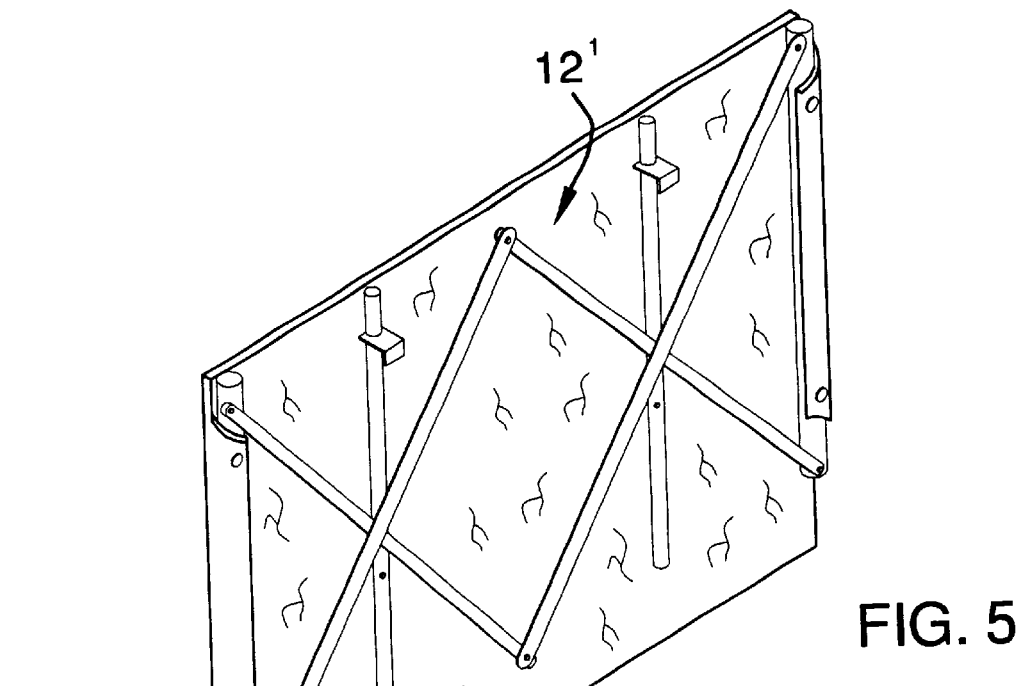
FIG. 5 is a schematic perspective of a second embodiment of the present invention.
Figure 6:
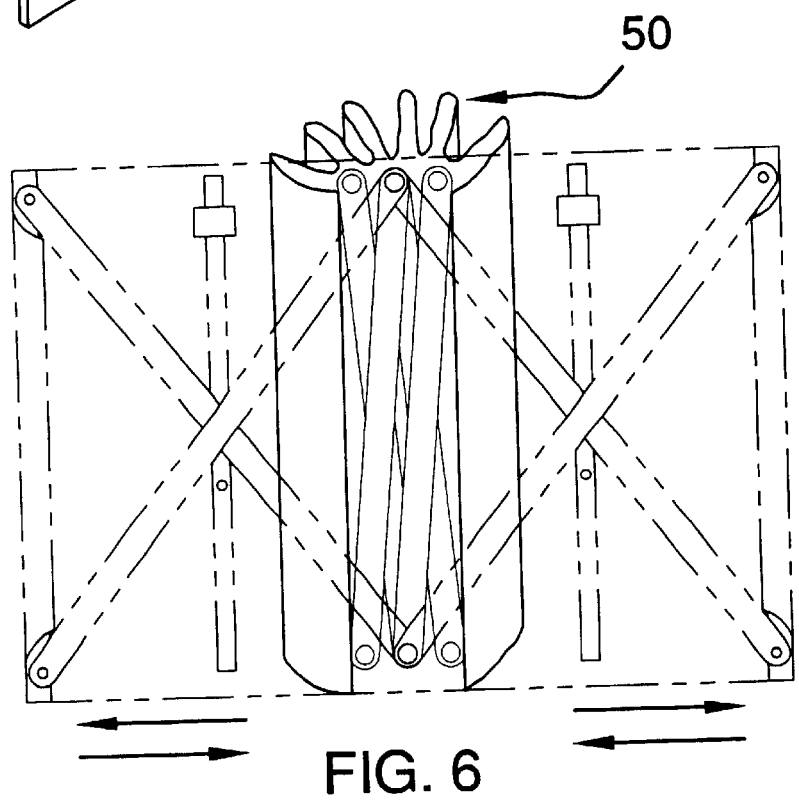
FIG. 6 is a schematic front view of the second embodiment of the present invention.

FIGS. 5 and 6 show a second embodiment 50 of the device 10 which includes a simplified frame i2. The second embodiment of the device also does not include the arcuate-portions 24. However, the second embodiment of the device 10 functions in generally the same method as the first embodiment depicted in FIGS. 1–4.

In use, each of the frames 12 is mounted on windows 7 of opposite sides of a vehicle 8. This is accomplished by placing the hooks 30 over an upper edge 6 of the window 7. The windows 7 may be raised to further secure the frames in position. The arcuate portions 24 are abutted against the window 7 to space the elongated members 14 from the vehicle 8 to protect it from scratches. The securing members 44 are attached to the mirrors 9 to hold the panels 32 in position. The slots 42 in the panel 32 allow for air to pass through the panels 32 to prevent their movement due to high winds.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cover assembly for selectively positioning over the windows of a vehicle, said assembly comprising:
    a pair of frames, each of said frames having a selectively expandable width;
    a plurality of mountings being attached to each of said frames, each of said mountings being adapted for removably coupling said frames to an upper edge of the windows;
    a pair of flexible panel each having a first side and a second side, each of said first sides of said pair of flexible panels being attached to one of said frames such that said frames are positioned between said mountings and said flexible panels; and
    wherein each of said frames are mounted on windows of opposite sides of the vehicle such that said flexible panels cover said windows.

2. The cover assembly of claim 1, wherein each of said frames comprises a plurality of elongated members secured together such that said elongated members are each positioned in a plane and a inner side and an outer side for each of said elongated members is defined, each of said elongate members having a longitudinal axis, each of said longitudinal axes being orientated substantially parallel to each other, a plurality of couplers couple each of said elongated members to an adjacent one of said elongated members such that adjacently positioned pairs of said elongate members may be selectively positioned narrowly spaced from each other or widely spaced from each other.

3. The cover assembly of claim 2, wherein each of said elongated members have an upper end and a lower end, each of said elongated members having an arcuate portion therein such that said inner sides have a convexly curved area, each of said arcuate portions being positioned nearer said lower end than said upper end.

4. The cover assembly of claim 3, wherein each of said mountings is attached to said frames such that said upper ends of said elongate members extend vertically above said mountings.

5. The cover assembly of claim 1, wherein each of said mountings comprises a hook.

6. The cover assembly of claim 1, wherein each of said flexible panels has an upper edge and a lower edge, each of said panels having a row of slots extending therethrough, each of said rows being orientated generally parallel to and spaced from one of said upper edges.

7. The cover assembly of claim 1, further including a pair of securing members, each of said securing members being attached to one of said flexible panels and positioned for removably attaching each of said flexible panels to one of a pair of side mirrors mounted on the vehicle.

8. The cover assembly of claim 7, wherein each of securing members includes a loop comprising an elastic material.

9. A cover assembly for selectively positioning over the windows of a vehicle, said assembly comprising:
    a pair of frames, each of said frames having a selectively expandable width, each of said frames comprising;
        a plurality of elongated members secured together such that said elongated members are each positioned in a plane and a inner side and an outer side for each of said elongated members is defined, each of said elongate members having a longitudinal axis, each of said longitudinal axes being orientated substantially parallel to each other, each of said elongated members having an upper end and a lower end, each of said elongated members having an arcuate portion therein such that said inner sides have a convexly curved area, each of said arcuate portions being positioned nearer said lower end than said upper end;
        a plurality of couplers couple each of said elongated members to an adjacent one of said elongated members such that adjacently positioned pairs of said elongate members may be selectively positioned narrowly spaced from each other or widely spaced from each other;
    a plurality of mountings being attached to each of said frames, each of said mountings being adapted for removably coupling said frames to an upper edge of the windows, each of said mountings being attached to said frames such that said upper ends of said elongate members extend vertically above said mountings, each of said mountings comprising a hook, each of said hooks being attached to one of said inner sides of said elongated members such that each of said elongated members has one hook attached thereon, each of said hooks being positioned nearer a respective one of said upper ends than said lower ends;

a pair of flexible panels each having a first side and a second side, each of said first sides of said pair of flexible panels being attached to one of said frames such that said frames are positioned between said mountings and said flexible panels, each of said flexible panels having an upper edge and a lower edge, each of said panels having a row of slots extending therethrough, each of said rows being orientated generally parallel to and spaced from one of said upper edges;

a pair of securing members, each of said securing members being attached to one of said flexible panels and positioned for removably attaching each of said flexible panels to one of a pair of side mirrors mounted on the vehicle, each of securing members including a loop comprising an elastic material; and wherein each of said frames are mounted on windows of opposite sides of the vehicle such that said flexible panels cover said windows.

\* \* \* \* \*